United States Patent
Lau et al.

(10) Patent No.: US 11,171,325 B2
(45) Date of Patent: Nov. 9, 2021

(54) OPTIMIZED ELECTRODE DESIGN FOR GRAPHENE BASED ANODES

(71) Applicant: SiNode Systems, Inc., Chicago, IL (US)

(72) Inventors: Joshua J. Lau, Chicago, IL (US); Cary M. Hayner, Chicago, IL (US); Seonbaek Ha, Chicago, IL (US); James Mckinney, Chicago, IL (US); Francis Wang, Chicago, IL (US); Christine A. Frysz, Orchard Park, NY (US)

(73) Assignee: NANOGRAF CORPORATION, Chicago, IL (US)

( * ) Notice: Subject to any disclaimer, the term of this patent is extended or adjusted under 35 U.S.C. 154(b) by 119 days.

(21) Appl. No.: 15/207,090

(22) Filed: Jul. 11, 2016

(65) Prior Publication Data
US 2018/0013135 A1    Jan. 11, 2018

(51) Int. Cl.
*H01M 4/36*    (2006.01)
*H01M 10/0525*    (2010.01)
(Continued)

(52) U.S. Cl.
CPC .......... *H01M 4/364* (2013.01); *H01M 4/133* (2013.01); *H01M 4/38* (2013.01); *H01M 4/382* (2013.01);
(Continued)

(58) Field of Classification Search
CPC ........ H01M 4/364; H01M 4/466; H01M 4/38; H01M 4/382; H01M 4/386; H01M 4/387;
(Continued)

(56) References Cited

U.S. PATENT DOCUMENTS

| 8,551,650 B2 | 10/2013 | Kung et al. |
| 8,778,538 B2 | 7/2014 | Kung et al. |

(Continued)

FOREIGN PATENT DOCUMENTS

| CN | 101837972 A | 9/2010 |
| JP | 2009511415 A | 3/2009 |

(Continued)

OTHER PUBLICATIONS

International Search Report and Written Opinion of the International Search Authority for International Patent Application No. PCT/US2017/039416, dated Sep. 20, 2017, 14 pages.

(Continued)

*Primary Examiner* — Ula C Ruddock
*Assistant Examiner* — Matthew W Van Oudenaren
(74) *Attorney, Agent, or Firm* — The Marbury Law Group PLLC (57) ABSTRACT

A negative electrode of a lithium ion electrochemical cell, the negative electrode including an active electrode material that includes a first component and a second component. The first component may include graphene, silicon, or a combination thereof. The second component may include silicon. The active electrode material may include particles in which the second component is encapsulated by the first component. The negative electrode may have an internal porosity of between 40 to 60 percent.

22 Claims, 2 Drawing Sheets

(51) Int. Cl.

| | | |
|---|---|---|
| *H01M 4/133* | (2010.01) | |
| *H01M 4/38* | (2006.01) | |
| *H01M 4/42* | (2006.01) | |
| *H01M 4/46* | (2006.01) | |
| *H01M 4/48* | (2010.01) | |
| *H01M 4/485* | (2010.01) | |
| *H01M 4/587* | (2010.01) | |
| *H01M 4/62* | (2006.01) | |
| *H01M 4/02* | (2006.01) | |

(52) U.S. Cl.
CPC ........... *H01M 4/386* (2013.01); *H01M 4/387* (2013.01); *H01M 4/42* (2013.01); *H01M 4/463* (2013.01); *H01M 4/466* (2013.01); *H01M 4/483* (2013.01); *H01M 4/485* (2013.01); *H01M 4/587* (2013.01); *H01M 4/623* (2013.01); *H01M 4/625* (2013.01); *H01M 10/0525* (2013.01); *H01M 2004/021* (2013.01); *H01M 2004/027* (2013.01); *Y02T 10/70* (2013.01)

(58) Field of Classification Search
CPC ........ H01M 4/42; H01M 4/463; H01M 4/133; H01M 4/483; H01M 4/485; H01M 4/587; H01M 4/623; H01M 4/625; H01M 10/0525; H01M 2004/021; H01M 2004/027

See application file for complete search history.

(56) References Cited

U.S. PATENT DOCUMENTS

| | | | |
|---|---|---|---|
| 8,835,027 B2 | 9/2014 | Thackeray et al. | |
| 2003/0044608 A1 | 3/2003 | Yoshizawa et al. | |
| 2003/0215717 A1* | 11/2003 | Miyaki | H01M 4/364 429/232 |
| 2004/0248010 A1 | 12/2004 | Kato et al. | |
| 2005/0233219 A1* | 10/2005 | Gozdz | H01M 4/13 429/231.95 |
| 2006/0292444 A1* | 12/2006 | Chiang | H01M 4/134 429/218.1 |
| 2007/0003837 A1* | 1/2007 | Nishimura | H01M 4/0404 429/232 |
| 2007/0092432 A1 | 4/2007 | Prud'Homme et al. | |
| 2007/0111106 A1 | 5/2007 | Kim et al. | |
| 2008/0160420 A1 | 7/2008 | Adachi et al. | |
| 2008/0206641 A1 | 8/2008 | Christensen et al. | |
| 2009/0117466 A1 | 5/2009 | Zhamu et al. | |
| 2009/0117467 A1 | 5/2009 | Zhamu et al. | |
| 2009/0169725 A1 | 7/2009 | Zhamu et al. | |
| 2009/0267028 A1* | 10/2009 | Hoshiba | H01G 11/38 252/500 |
| 2010/0285362 A1* | 11/2010 | Christensen | H01M 10/052 429/231.95 |
| 2011/0111303 A1 | 5/2011 | Kung et al. | |
| 2013/0344392 A1* | 12/2013 | Huang | H01M 4/366 429/231.8 |
| 2014/0015160 A1 | 1/2014 | Kung et al. | |
| 2014/0255785 A1* | 9/2014 | Do | C09D 1/00 429/231.8 |
| 2015/0099173 A1* | 4/2015 | Sun | C22C 38/02 429/218.1 |
| 2015/0280219 A1* | 10/2015 | Xiao | H01M 4/625 429/231.8 |
| 2016/0043384 A1* | 2/2016 | Zhamu | H01M 4/133 429/231.4 |

FOREIGN PATENT DOCUMENTS

| | | |
|---|---|---|
| JP | 2011503804 A | 1/2011 |
| JP | 2011076931 A | 4/2011 |
| JP | 2013084600 A | 5/2013 |
| KR | 1020090009053 A | 1/2009 |
| WO | WO2011057074 A2 | 5/2011 |
| WO | WO 2016/019382 A1 | 2/2016 |
| WO | WO2016019382 A1 | 2/2016 |

OTHER PUBLICATIONS

Lee et al., "Silicon Nanoparticles-Graphene Paper Composites for Li Ion Battery Anodes," Chem. Commun., vol. 46, (2010) pp. 2025-2027.

Kovtyukhova et al., "Layer-by-Layer Assembly of Ultrathin Composite Films for Micron-Sized Graphite Oxide Sheets and Polycations," Chem. Mater., vol. 11 (1999), pp. 771-778.

SIPO, Office Action, Chinese Application No. 201180070689.X, dated Jun. 18, 2015, 9pgs.

JPO, Office Action, Japanese Application No. JP2014510287, dated Feb. 10, 2015, 5pgs.

Extended Supplemental European Search Report, EP Application No. 11864999.5, dated Oct. 13, 2014.

Du et al., "Graphene Nanosheets as Electrode Material for Electric Double-Layer Capacitors," Electrochimica Acta, vol. 55 (2010), pp. 4812-4819.

Guo et al., "Electrochemical Performance of Graphene Nanosheets as Anode Material for Lithium-ion Batteries," Electrochemistry Communications, vol. 11 (2009), pp. 1320-1324.

Chou et al., "Enhanced Reversible Lithium Storage in a Nanosize Silicon/Graphene Composite," Electrochemistry Communications, vol. 12 (2010), pp. 303-306.

Xiang et al., "Graphene/nanosized Silicon Composites for Lithium Battery Anodes with Improved Cycling Stability," Carbon, vol. 49 (2011), pp. 1787-1796.

Tarascon et al., "Issues and Challenges Facing Rechargeable Lithium Batteries," Nature, vol. 414 (2001), pp. 359-367.

Armand et al., "Building Better Batteries," Nature, vol. 451 (2008), pp. 652-657.

Paek et al., "Enhanced Cyclic Performance and Lithium Storage Capacity of SnO2/Graphene Nanoporous Electrodes with Three-Dimensionally Delaminated Flexible Structure," Nano Letters, vol. 9, No. 1 (2008), pp. 72-75.

Yang et al., "Fabrication of Graphene-Encapsulated Oxide Nanoparticles: Towards High-Performance Anode Materials for Lithium Storage," Agnew. Chem. Int. Ed., vol. 49, No. 45 (2010), pp. 8408-8411.

Wu et al., "Graphene Anchored with Co2O4 Nanoparticles as Anode of Lithium Ion Batteries with Enhanced Reversible Capacity and Cyclic Performance," ACS Nano, vol. 4, No. 6 (2010), pp. 3187-3194.

Pan et al., "Li Storage Properties of Disordered Graphene Nanosheets," Chem. Mater., vol. 21, No. 14 (2009), pp. 3136-3142.

Banhart et al., "Structural Defects in Graphene," ACS Nano, vol. 5, No. 1 (2011), pp. 26-41.

Hummers et al., "Preparation of Graphitic Oxide," J. Am. Chem. Soc., vol. 80 (1959), p. 1339.

Coleman et al., "Defect Formation in Graphene Nanosheets by Acid Treatment: An X-ray Absorption Spectroscopy and Density Functional Theory Study," Journal of Physics D: Applied Physics, vol. 41, Feb. 21, 2008, pp. 1-4.

David, L. et al., "Silicon oxycarbide glass-graphene composite paper electrode for long-cycle lithium-ion batteries," Nature Communications, pp. 1-10, (2016).

Gan, L. et al., "A facile synthesis of graphite/silicon/graphene spherical composite anode for lithium-ion batteries," Electrochimica Acta, vol. 104, pp. 117-123, (2013).

U.S. Appl. No. 14/745,747, filed Jun. 22, 2015, SiNode Systems, Inc.

U.S. Appl. No. 14/816,207, filed Aug. 3, 2015, SiNode Systems, Inc.

International National Preliminary Report on Patentability and Written Opinion of the International Searching Authority for Inter- (56) References Cited

OTHER PUBLICATIONS national Patent Application No. PCTU/US2017/039416, dated Jan. 24, 2019, 11 pages.

* cited by examiner

OPTIMIZED ELECTRODE DESIGN FOR GRAPHENE BASED ANODES

TECHNICAL FIELD

This invention relates to the art of electrochemical cells, and more particularly, to a new and improved electrochemical cell, and electrode design therefore. More particularly, the present invention is directed to an electrode design for use in a lithium ion electrochemical cell that increases charge-discharge rate capability while minimizing capacity loss.

BACKGROUND

Lithium (Li) ion electrochemical cells typically have a relatively high energy density and are commonly used in a variety of applications which include consumer electronics, wearable computing devices, military mobile equipment, satellite communication, spacecraft devices and electric vehicles. Lithium ion cells are particularly popular for use in large-scale energy applications such as low-emission electric vehicles, renewable power plants and stationary electric grids. Additionally, lithium ion cells are at the forefront of new generation wireless and portable communication applications. One or more lithium ion cells may be used to configure a battery that serves as the power source for these applications. The explosion in the number of higher energy demanding applications and the limitations of existing lithium ion technology are accelerating research for higher energy density, higher power density, higher-rate charge-discharge capability, and longer cycle life lithium ion cells.

Lithium ion cells are mainly composed of an anode, for example, graphite, a carbonate-based organic electrolyte, and a cathode comprising a cathode active material, for example, lithium cobalt oxide ($LiCoO_2$). Lithium ions are intercalated and deintercalated (e.g., inserted and extracted) between the anode and the cathode through the electrolyte during discharge and charge. When electrical energy is removed from the cell to supply power, or is discharging, lithium ions move from the negative electrode (anode) to the positive electrode (cathode). When the cell is supplied electrical energy for conversion to stored chemical energy, or is charging, the opposite occurs. Lithium ions generally move from the positive electrode (the cathode) to the negative electrode (the anode) during charging. For the example, the theoretical capacities of a graphite anode and a $LiCoO_2$ cathode are 372 mAh/g and less than 160 mAh/g, respectively. These theoretical charge capacities, however, are often too low for the recent surge in higher energy demanding applications.

Incorporating silicon within a carbon based anode significantly increases the capacity of the anode material. Silicon has a theoretical capacity of about 4,200 mAh/g which significantly increases cell capacity when incorporated within an electrode comprising graphite, graphene, or other carbon based active material. Examples of electrodes comprising graphene and silicon are provided in U.S. Pat. No. 8,551,650 to Kung et al. and U.S. patent application publication number 2013/0344392 to Huang et al., both of which are incorporated herein by reference.

While the addition of silicon within an electrode comprising graphite or graphene generally increases capacity of a lithium ion cell, incorporation of silicon within these electrodes typically decreases the rate capability of the cell, particularly at increased electrical currents, which decreases the power of the cell. It is generally understood that in the case of the addition of silicon within a carbon based electrode, as the discharge/charge current is increased, the effective capacity of the cell is decreased due to a buildup of heat and internal electrical resistance. This causes the cell to reach its cutoff voltage before a complete charge or discharge has occurred.

The reduced power and rate capability of the lithium cell at increased currents, is largely due to the silicon's insulative electrical properties as the material has an electrical resistance of about $2.3 \times 10^3$ Ω·m at 20° C. In addition, the increased electrical resistivity of the silicon, retards the redox alloying process that occurs when lithium enters the silicon structure. As a result, the rate of lithium diffusion through silicon that occurs within the electrode of a lithium cell decreases.

Furthermore, it is generally understood that silicon that is incorporated within these electrodes typically undergoes a significant volume expansion of up to 400 percent upon the insertion and extraction of lithium during the cycling process. As a result of this significant volume increase, the silicon within the electrode structure experiences a significant mechanical stress which typically causes the material to crack and impart defects within its structure. It is generally believed that these defects that are created within the silicon structure impede the movement of lithium ions therewithin, which contributes to a reduction in the diffusion of lithium through the electrode. For example, cracks and other defects within the structure of the silicon, caused by the increased mechanical stress of the volume expansion, may block the diffusion of lithium ions or may cause the ions to bypass these defects which increases the length of travel of the ions through the structure. As a result, the diffusion of lithium ions through the electrode structure is decreased by a combination of a reduced volume of ion diffusion within the electrode structure and an increase in the distance of travel by the ions. This reduction in the diffusion of lithium ions through the electrode structure contributes to a decrease in the charge-discharge rate capability of the lithium ion cell, particularly at increased electrical currents. For example, lithium ion cells that comprise a silicon graphene electrode of the prior art typically exhibit a specific discharge capacity at a discharge rate of 10 C that is about 50% less than the specific discharge capacity at a discharge rate of 3 C.

Accordingly, there is a need for a lithium cell with increased capacity with increased power that exhibits increased charge-discharge rate capability at increased electrical currents. More specifically, there is a need for lithium ion cells that are capable of generating increased specific discharge capacities at increased discharge rates. The present invention, therefore, addresses this problem by disclosing an electrode that comprises graphene and silicon for use in a lithium ion electrochemical cell thereof that outputs increased energy at increased discharge rates.

The present invention provides an electrode and lithium ion cell thereof, having an improved material and electrode design that provides for increased capacity at increasing charge/discharge rates.

SUMMARY

In general, the present invention relates to a structure and method of formation thereof of an electrode that is incorporatable within an electrochemical cell. More specifically, the present invention relates to the structure and method of formation thereof of an electrode comprising silicon and graphene for use with a lithium ion electrochemical cell that is designed to provide increased capacity with increased rate capability at increased electrical currents, thereby increasing the power and energy density of the cell.

The electrode or anode of the present invention comprises an active electrode material composed of a matrix of electrochemically active material components. In a preferred embodiment, the active electrode material comprises a plurality of particles in which each of the particles comprises a first active material component of graphene or graphene oxide that encases at least one of a second active material component of silicon and silicon oxide therewithin. The particles of the active electrode material may comprise a multitude of structures, including but not limited to, a crumpled, paper ball-like structure, a core-shell structure, or a substantially spherical-like shape. The preferred particle structure of the active electrode material provides a compact structure that increases electrical conductivity and decreases the distance in which lithium ions diffuse. In addition, the preferred particle structure provides for an internal void space within the structure of each of the particles that tolerates swelling minimizing known negative effects that compromise achievable capacity thereby preserving capacity as the cell is charged and discharged.

The active electrode material is combined with a solvent, conductive additive, and a binder to produce an electrode slurry that is applied to a surface of a substrate composed of a variety of materials. Examples of substrate materials include, but are not limited to, metals, polymers, ceramics and glasses. The applied electrode slurry is dried and then calendered to compress the electrode to improve the mechanical integrity and provide the electrode with a desired internal porosity for use in a lithium ion cell. The increased porosity within the electrode structure provides additional channels within which lithium ions can travel. The additional channels, provided by the increased porosity, thus provides for an increased volume of lithium ions that travel through the material structure at increased rates. Therefore, constructing the electrode with an increased internal porosity increases the diffusion of lithium ions within the electrode structure. First, the internal porosity provides additional pathways within the electrode structure for the lithium ions to travel. Second, the additional pathways created by the increased internal porosity allows for an increased volume of lithium ions to diffuse within the electrode structure. Third, the increased internal porosity improves the wetting of the electrolyte with the electrode. As a result, electrical conductivity and the rate capability of the cell are increased.

Furthermore, since each of the particles that comprise the electrode material are encased with an outer layer of graphene, a material with a relatively high electrical sheet conductivity of about $10^6$ S/cm, the electrical conductivity within and surrounding the particles, is increased. Thus, the structure of the particles comprising an outer layer of graphene provides a matrix electrode material structure with significantly increased electrical conductivity.

In addition, the electrode is constructed having a reduced thickness. Thus, by constructing the anode with a specific reduced thickness, the distance travelled by the lithium ions as they diffuse through the bulk of the electrode, decreases, thereby enabling high rate performance. Due to the high lithium capacity of the silicon-graphene anode, the electrode of reduced thickness can store an equivalent amount lithium as a thicker traditional graphite anode. The increased storage capacity allows for improved energy density of the cell while allowing the electrode to be designed in a manner that is conducive to high rate charge and discharge. Therefore, decreasing the thickness of the anode also contributes to the increased rate capability to produce a lithium ion electrochemical cell having increased power and energy density.

DETAILED DESCRIPTION

The present application discloses a novel electrode, and method of fabrication thereof, that is incorporatable within an electrochemical cell. An electrode of the present disclosure may be an anode or negative electrode that is incorporatable within a secondary lithium-ion electrochemical cell. As defined herein a "secondary" electrochemical cell is an electrochemical cell or battery that is rechargeable. "Capacity" is defined herein as the maximum amount of energy that can be extracted from the battery under certain specified conditions; the amount of electric charge that can be delivered at a rated voltage. Capacity may be measured in units of amp-hour (A·h). "Specific capacity" is defined herein as the amount of electric charge that can be delivered at a rated voltage per unit of mass or unit of volume of active electrode material. Specific capacity may be measured in gravimetric units, for example, (A·h)/g or volumetric units, for example, (A·h)/cc. "Rate capability" is the ability of an electrochemical cell to receive or deliver an amount of energy within a specified time period. Alternately, "rate capability" is the maximum continuous or pulsed output current a battery can provide per unit of time. Thus, an increased rate of charge delivery occurs when a cell discharges an increased amount of current per unit of time in comparison to a similarly built cell, but of a different anode and/or cathode chemistry. "C-rate" is defined herein as a measure of the rate at which a battery is discharged relative to its maximum capacity. For example, a 1 C rate means that the discharge current will discharge the entire battery in 1 hour. "Power" is defined as time rate of energy transfer, measured in Watts (W). Power is the product of the voltage (V) across a battery or cell and the current (A) through the battery or cell.

Electrodes of the present disclosure preferably include an active electrode material that comprises a graphenic based matrix material. More specifically, the graphenic based matrix material preferably comprises a plurality of particles, each of which comprises a first active electrode material component that encapsulates an internal cargo of a second active electrode material component or plurality of components. In some embodiments, the first active material component comprises graphene, graphene oxide or a combination thereof. Examples of second active electrode material components may include, but are not limited to, silicon, silicon oxide, titanium oxide, graphite, carbon, metal nanoparticles (e.g., silver or platinum), salts, such as CsCl, and combinations thereof. The particles of the active electrode material may have a structure of a variety of shapes. More preferably, the particles of the active electrode material may have a structure that is specifically engineered to be of a substantially crumpled, paper ball-like structure, a core-shell structure, or a substantially spherical-like shape in which the graphene or graphene oxide forms an outer layer of the particle structure and silicon and/or silicon oxide is incorporated within the graphene or graphene oxide. Further details about preferred active electrode materials and structures thereof are disclosed in U.S. Patent Application Publication Numbers 2013/0004798 and 2013/0344392, both to Huang et al., and all of which are incorporated herein by reference. The preferred particle shapes of the active electrode material tolerate particle swelling minimizing capacity loss, particularly of the silicon or silicon oxide therein. Swelling tolerance preserves the capacity of the electrode and resulting electrochemical cell.

In addition, the outer structure of graphene which encases the silicon, increases the electrical conductivity between the graphene and silicon. In addition, the outer graphene structure further enhances the electrical conductivity between the silicon and current collector, the supporting substrate and the surrounding area of the particles. Thus, the increased electrical conductivity provided by the outer layer of graphene, contributes to the increase in the rate capability of the resulting electrode structure and lithium ion cell. In particular, the increased electrical conductivity provided by the preferred particle structure, particularly the outer layer of graphene, contributes to an increase in the rate capability of the resulting electrode and lithium ion cell.

In a preferred embodiment, the active electrode material has a particle size distribution that ranges from about 0.5 µm to about 10 µm. More preferably, the particle size of the active electrode material ranges from about 2 µm to 5 µm. In a preferred embodiment, the particle size of the second active electrode component may range from about 30 nm to about 100 nm.

Alternatively, the active electrode material may comprise a structure of a plurality of graphene sheets that are preferably arranged in a vertical stack. The vertical stack structure preferably has a continuous network of graphitic regions comprising both crystalline and non-crystalline "disordered" portions of graphene. Furthermore, the continuous network of graphitic regions is integrated with a composite comprising: (a) disordered portions of the vertical stack of graphene sheets; and (b) a second constituent, such as silicon (Si), tin (Sn), tin oxide, antimony (Sb), aluminum (Al), silver (Ag), germanium (Ge), gallium (Ga), magnesium (Mg), zinc (Zn), lead (Pb), bismuth (Bi), carbon (C), titanium oxide, lithium titanium oxide, their alloys, intermetallics, and mixtures thereof, preferably in a nano-particle form. In addition, at least some of the graphene sheets within the vertical stack may comprise defect pores formed by in-plane carbon vacancies which pre-exist or can be intentionally created. In a preferred embodiment, at least a plurality of the defect pores is randomly distributed throughout the graphene sheet structure. Further details about this alternative active electrode material embodiment is disclosed in U.S. Pat. Nos. 8,551,650 and 8,778,538, both to Kung et al., and all of which are incorporated herein by reference. Other suitable active electrode material compositions may include, but are not limited to, graphite, synthetic graphite, coke, fullerenes, other graphitic carbons, niobium pentoxide, tin alloys, silicon, silicon alloys, silicon-based composites, titanium oxide, tin oxide, and lithium titanium oxide.

Figure 1:
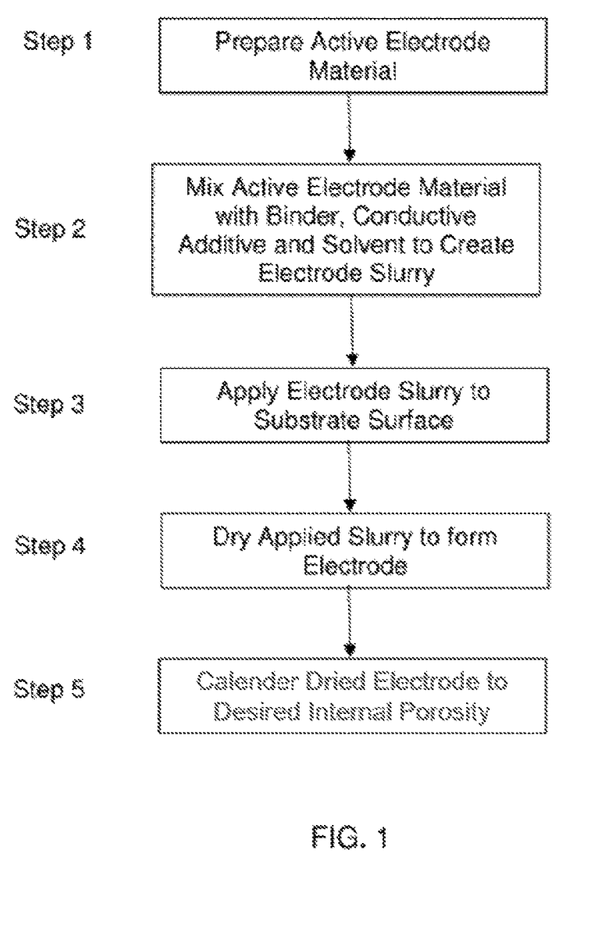
FIG. 1 is a process flow chart that illustrates an embodiment of the electrode fabrication process of the present invention.

In an embodiment, the electrode of the present invention is constructed from an electrode slurry that comprises the active electrode material, a binder, a conductive additive, and a solvent. FIG. 1 provides an overview of the present electrode fabrication process. Appropriate proportions of the active electrode material and the other constituents are first mixed together to form the electrode slurry. Once fabricated, the electrode slurry is applied to a surface of an electrode current collector, preferably composed of an electrically conductive material, such as copper, to create an electrode for use in an electrochemical cell. After the electrode slurry has been applied to the surface of a substrate, such as a current collector, the electrode slurry is dried and calendered to compress the electrode to a desired porosity.

A dispersant (including surfactants, emulsifiers, and wetting aids), a thickening agent (including clays), defoamers and antifoamers, biocides, additional fillers, flow enhancers, stabilizers, cross-linking and curing agents may be added to the slurry mixture to ensure a homogenous mixture thereof. Examples of dispersants include, but are not limited to, glycol ethers (such as poly(ethylene oxide), block copolymers derived from ethylene oxide and propylene oxide (such as those sold under the trade name Pluronic® by BASF), acetylenic diols (such as 2,5,8,11-tetramethyl-6-dodecyn-5,8-diol ethoxylate and others sold by Air Products under the trade names Surfynol® and Dynol®), salts of carboxylic acids (including alkali metal and ammonium salts), and polysiloxanes. Additional examples of dispersants may include sodium dodecanoate, alkanolamide, lanolin, polyvinylpyrrolidone, sodium alkyl sulfate, sodium alkyl sulfonate, lecithin, polyacrylate, sodium silicate, and polyethoxy, nitrocellulose and Triton® X-100 a dispersant having the chemical formula, $(C_2H_4O)nC_{14}H_{22}O$ produced by DOW Chemical company of Midland Mich.

Examples of thickening agents include long-chain carboxylate salts (such aluminum, calcium, zinc, salts of stearates, oleats, palmitates), aluminosilicates (such as those sold under the Minex® name by Unimin Specialty Minerals and Aerosil® 9200 by Evonik Degussa), fumed silica, natural and synthetic zeolites. In a preferred embodiment, the slurry mixture may comprise from about 0.01 to about 1.0 weight percent dispersant and/or thickening agent.

Preferred binders may include, but are not limited to, a fluoro-resin powder such as polytetrafluoroethylene (PTFE), polyvinylidene fluoride (PVDF), poly(acrylic) acid, polyethylenetetrafluoroethylene (ETFE), polyamides, and polyimides, and mixtures thereof. Additional binders may include, but are not limited to, polyethylene (UHMW), styrene-butadiene rubber, cellulose, polyacrylate rubber, and copolymers of acrylic acid or acrylate esters with polyhydrocarbons such as polyethylene or polypropylene, and mixtures thereof. Preferred solvents may include, but are not limited to, deionized water, ethanol, isopropyl alcohol, ethylene glycol, ethyl acetate, polar protiac solvents, polar aprotic solvents, N-methyl-2-pyrrolidone, and combinations thereof. Preferred conductive additives may include but are not limited to, carbon black, an electrically conductive polymer, graphite, or a metallic powder such as powdered nickel, aluminum, titanium, and stainless steel.

In various embodiments, the active electrode slurry may comprise from about 50 to about 85 weight percent of the active electrode material, from about 10 to about 25 weight percent binder, from about 2 to about 7 weight percent the conductive additive and the remainder comprising the solvent or solvent solution. In preferred embodiments, the active electrode slurry has a solids content that ranges from about 15 to about 35 weight percent. More preferably, the slurry has a solids content that ranges from about 20 weight percent to about 30 weight percent. The preferred solids content of the slurry allows for an ideal slurry viscosity that enhances a preferred uniform coating on a substrate or current collector.

Each of the active electrode constituents may be added separately, or alternatively, as separate electrode suspensions comprising at least portions of the active electrode slurry component materials that are combined to create the electrode slurry of the present invention. In an exemplary embodiment, the components of the active electrode slurry are mixed to a uniform consistency. The slurry components may be mixed together using a variety of unlimited techniques such as ball milling or planetary mixing.

Mixing times may range from about 30 minutes to 2 hours depending on batch size to achieve a uniform, homogenous slurry mixture. Milling media may also be added to the slurry to aid in creating a homogenous mixture. The electrode slurry may be further dispersed through manual or automated agitation. Such agitation may include physical shaking or rocking of the suspension. In addition, the electrode slurry may be subjected to ultrasonication for about 30 seconds to about 30 minutes to further disperse the silicon and carbon particles and help to create a homogeneous electrode suspension mixture. The electrode slurry should be prepared such that it is able to adequately flow and adhere onto the surface of the substrate. In a preferred embodiment, the electrode slurry may have a viscosity ranging from about 0.1 Pa·S to about 1,000 Pa·S at a shear rate of between about 0.1 to 1,000 $s^{-1}$.

After the electrode slurry has been formulated, the slurry is applied to the surface of a substrate. In an embodiment, the electrode slurry may be applied to the surface of a substrate comprising a metal, a polymer, a ceramic, and combinations thereof. Non-limiting examples of substrate materials may include, but are not limited to, metals such as copper, aluminum, nickel, and their alloys, polymers such as polyethylene, polyimide, and polyether ether ketone (PEEK), as well as alumina and various glasses. In a preferred embodiment, the electrode slurry is applied to the surface of a current collector such as those composed of copper, nickel, aluminum, and combinations thereof.

In various embodiments, the electrode slurry may be applied to a desired thickness ranging from a few nanometers to a few micrometers using a variety of non-limiting application techniques. In a preferred embodiment, the thickness of the applied electrode slurry may range from about 5 μm to about 50 μm. These application techniques may include, but are not limited to, the use of Meyer rod coating, the use of a doctor blade or knife, spray coating, dip coating, spin coating or brush application. In addition, the electrode slurry layer may be applied to a substrate surface through the use of thick-film or thin-film processing techniques.

Furthermore, in various embodiments, the surface of the substrate may be modified prior to the application of the electrode slurry to improve adhesion to the substrate surface. Examples of such substrate surface modifications include, but are not limited to, surface etching or surface roughening through the use corona treatment, acid etching, sand blasting or bead blasting.

After the electrode slurry has been applied to the surface of the substrate, it is then dried to remove at least a majority of the solvent. In an embodiment, the electrode slurry layer may be dried using convection air drying, a UV light source and/or an infrared light source. Additionally the electrode slurry may be dried through the use of freeze drying, vacuum drying, or through osmosis. In addition, the slurry may be dried through application of a heat source that is applied directly to the exposed surface of the electrode slurry coating or alternatively, the electrode slurry may also be dried through application of a heat source to the underlying substrate, or both. Furthermore, the electrode slurry may be dried in a variety of non-limiting atmosphere conditions having a variety of atmospheric pressures. For example, a gas such as nitrogen may be used to control the drying process. In various embodiments, the applied electrode slurry is dried under a UV-light source for about 1 hour afterwards it is then dried in an oven at about 80° C. for between about 2 to 24 hours, or until the solvent has been substantially removed from the resulting electrode structure.

In some embodiments, the electrode ink is dried to a thickness ranging from about 5 μm to about 50 μm. More preferably, the electrode ink is dried to a thickness ranging from about 8 μm to about 15 μm. The thickness of the dried electrode layer(s) is preferably targeted to achieve an increase in electrical power. The reduced electrode thickness minimizes the diffusion distance and which enables rapid lithium ion migration within the electrode structure.

The drying process of the present invention is preferred because it allows for the active electrode material, particularly particles comprising a graphene encased silicon or silicon oxide, to maintain their internal void space. Subjecting the dried electrode to further elevated heating conditions, such as sintering, may lead to a decrease in electrical conductivity of the material and in addition, and may cause the silicon or silicon oxide within the particle to become fused to the graphene or graphene oxide. As a result, the capacity generated by the particles may decrease.

After the slurry is dried, the formed electrode is then calendered. In some embodiments, the calendering process compresses the electrode thus decreasing the void space within the dried electrode. In various embodiments, the dried electrode is calendered to achieve a target void space and internal porosity that provides for increased lithium diffusion, in addition to structural integrity. In various embodiments, the calendering process may utilize a roller, or other such tool, that is rolled over the dried electrode to ensure a proper internal porosity. In various embodiments, the calendering process may range from about 30 seconds to about 5 minutes depending upon the thickness of the electrode and the desired internal porosity. In some embodiments, the electrode internal porosity may range from about 40 percent to about 60 percent, more preferably, the internal porosity is about 50 percent. Internal porosity is measured by the following equation:

$$\text{Porosity (\%)} = 1 - \left(\frac{\text{measured density}}{\text{theoretical density}}\right)$$

where the measured density is measured by dividing the mass of the dried electrode by its volume and the theoretical density is the density of the active electrode material that is 100 percent dense. The theoretical density is assumed to be 2.25 g/cubic centimeter. In various embodiments, constructing the electrode to a targeted optimal internal porosity provides additional channels within which lithium ions may diffuse while also providing the required structural integrity for long life in an electrochemical environment within the cell. The increased internal porosity thus provides for an increased volume of lithium ions to diffuse through the electrode. In addition, increasing the internal porosity shortens the distance with which lithium ions travel through the electrode. As a result of the increased internal porosity, the charge/discharge rate capability of the electrode and resulting electrochemical cell increases.

The electrode thus comprises an active electrode material portion comprising a first active material component of graphene or graphene oxide, a second active material component comprising silicon (Si), silicon oxide, tin (Sn), tin oxide, antimony (Sb), aluminum (Al), silver (Ag), germanium (Ge), gallium (Ga), magnesium (Mg), zinc (Zn), lead (Pb), bismuth (Bi), carbon (C), titanium oxide, lithium titanium oxide, their alloys, intermetallics, and mixtures thereof, and a third non-active material portion comprises a carbon material, at least a portion thereof may comprise amorphous carbon. In various embodiments, after the drying process, the resultant electrode material (e.g., negative electrode) includes, based on the total weight of the electrode material/negative electrode, from about 28 to about 70 weight percent of the first active material, from about 30 weight percent to about 70 weight percent of the second active material, and from about 0.01 weight percent to about 5 weight percent of the third non-active material.

In one example, 1 g of active electrode material in a particulate form comprising silicon encapsulated in graphene was mixed with 0.07 g of carbon black, 2.7 g of poly(acrylic) acid and the remainder DDI water to achieve a solids content of 27 weight percent. The components were then mixed together in a planetary mixer for about 30 minutes to achieve a uniform homogenous consistency. A layer of the electrode slurry having a thickness of about 40 µm was applied to a copper current collector and dried to a thickness of about 10 µm. The dried electrode was then calendered using a roller to achieve an internal porosity of about 50 percent.

After the electrode layer(s) are dried and calendered, the electrode layer(s) and current collector substrate subassembly may be cut to form an electrode of an appropriate shape for incorporation into an electrochemical cell. Alternatively, the electrode layer may be removed from the substrate to form a free standing electrode. The term 'free standing' is defined herein as sufficiently isolated from its environment, in this case, sufficiently absent the substrate.

The formulated electrode is preferably an anode or negative electrode that is utilized within a secondary lithium-ion electrochemical cell. The electrochemical cell of the present invention further comprises a cathode composed of an electrically conductive material that serves as the other, positive electrode of the cell. The cathode is preferably of solid materials and the electrochemical reaction at the cathode involves conversion of lithium ions that migrate back and forth between the anode, i.e., a first electrode, and the cathode, i.e., a second electrode, into atomic or molecular forms. During discharge of the cell, lithium ions flow from the anode or negative electrode to the cathode or positive electrode. To recharge such secondary cells, lithium ions from the cathode or positive electrode are intercalated into the anode by applying an externally generated electrical potential to the cell. The applied recharging potential serves to draw lithium ions from the cathode material, through the electrolyte and into the anode.

The solid cathode may comprise a cathode active material of a metal oxide, a lithiated metal oxide, a metal fluoride, a lithiated metal fluoride or combinations thereof as disclosed in U.S. patent application Ser. No. 14/745,747 to Hayner et al., which is assigned to the assignee of the present application and incorporated herein by reference. In a preferred embodiment, the cathode active material comprises $LiNi_x Co_y Al_z O_2$, where x, y, and z are greater than 0 and wherein $x+y+z=1$. Other preferred cathode active materials may include, but are not limited to lithium cobalt oxide ($LiCoO_2$), lithium iron phosphate ($LiFePO_4$) and lithium manganese oxide ($LiMn_2O_4$). Additional preferred cathode active materials may also include, but are not limited to, $LiNi_xMn_yCo_zO_2$, where $0.3 \leq x \leq 1.0$, $0 \leq y \leq 0.45$, and $0 \leq z \leq 0.4$ with $x+y+z=1$. Furthermore, the cathode active material may comprise $Li_{1+x}Ni_\alpha Mn_\beta Co_\gamma O_2$, where x ranges from about 0.05 to about 0.25, α ranges from about 0.1 to about 0.4, β ranges from about 0.4 to about 0.65, and γ ranges from about 0.05 to about 0.3.

In a larger scope, the cathode active material may comprise sulfur (S), lithium sulfide ($Li_2S$), a metal fluoride, a lithium metal fluoride, a lithium metal phosphate, and a lithium metal silicate where the metal may comprise a transition metal from the Periodic Table of Elements, such as iron (Fe), manganese (Mn), cobalt (Co), nickel (Ni), copper (Cu), vanadium (V), chromium (Cr), non-transition metals such as bismuth (Bi), and combinations thereof. Specific examples of cathode active materials may include $MF_x$ where $0 \leq x \leq 3$, $Li_xMF_x$ where $0 \leq x \leq 3$, $LiMPO_4$, $Li_2MSiO_4$ composite layered-spinel structures such as $LiMn_2O_4$-$LiMO$ where M is a transition metal from the Periodic Table of Elements, such as iron (Fe), manganese (Mn), cobalt (Co), nickel (Ni), copper (Cu), vanadium (V), chromium (Cr), a non-transition metal such as bismuth (Bi), and combinations thereof. Lithium rich positive active electrode materials of particular interest can also be represented approximately by the formula $Li_{1+x}Ni_a Mn_b Co_c A_d O_{2-z} F_z$, where x ranges from about 0.01 to about 0.3, a ranges from about 0 to about 0.4, b ranges from about 0.2 to about 0.65, c ranges from 0 to about 0.46, d ranges from 0 to about 0.15 and Z ranges from 0 to about 0.2 with the proviso that both a and c are not zero, and where A is magnesium (Mg), strontium (Sr), barium (Ba), cadmium (Cd), zinc (Zn), aluminum (Al), gallium (Ga), boron (B), zirconium (Zr), titanium (Ti), calcium (Ca), selenium (Ce), yttrium (Y), niobium (Nb), chromium (Cr), iron (Fe), vanadium (V), lithium (Li) or combinations thereof. A person of ordinary skill in the art will recognize that additional ranges of parameter values within the explicit compositional ranges above contemplated and are within the present disclosure.

The cathode active material may be formed by the chemical addition, reaction, or otherwise intimate contact of various oxides, phosphates, sulfides and/or metal elements, preferably during thermal treatment, sol-gel formation, chemical vapor deposition, or hydrothermal synthesis in mixed states. The cathode active material thereby produced may contain metals, oxides, phosphates, and sulfides of Groups, IB, IIB, IIIB, IVB, VB, VIB, VIIB, VIII, and VIIA which includes the noble metals and/or other oxide and phosphate compounds. A preferred cathode active material is a reaction product of stoichiometric proportions of at least fully lithiated to non-lithiated, $LiNi_{0.8}Co_{0.15}Al_{0.05}O_2$.

The exemplary cell further includes a separator to provide physical separation between the anode and cathode. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, microporous material, glass fiber materials, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.).

The form of the separator typically is a sheet which is placed between the anode and cathode and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The exemplary electrochemical cell is preferably activated with a nonaqueous, ionically conductive electrolyte operatively associated with the anode and the cathode. The electrolyte serves as a medium for migration of lithium ions between the anode and the cathode during electrochemical reactions of the cell, particularly during discharge and re-charge of the cell. The electrolyte is comprised of an inorganic salt dissolved in a nonaqueous solvent and more preferably an alkali metal salt dissolved in a mixture of low viscosity solvents including organic esters, ethers and dialkyl carbonates and high conductivity solvents including cyclic carbonates, cyclic esters and cyclic amides.

Additional low viscosity solvents useful with the present invention include dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate (DEC), dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof.

Preferred electrolytes of the present invention comprises an inorganic salt having the general formula $YAF_6$ wherein Y is an alkali metal similar to the alkali metal comprising the anode and A is an element selected from the group consisting of phosphorous, arsenic and antimony. Examples of salts yielding $AF_6$ are: hexafluorophosphate ($PF_6$), hexafluoroarsenate ($AsF_6$) and hexafluoroantimonate ($SbF_6$). In addition, other salts may comprise lithium salts including $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6FSO_3$, $LiO_2CCF_3$, $LiSO_6F$, $LiB(C_6H_5)_4$, $LiCF_3SO_3$, and mixtures thereof. More preferably, the electrolyte comprises at least one ion-forming alkali metal salt of hexafluoroarsenate or hexafluorophosphate dissolved in a suitable organic solvent wherein the ion-forming alkali metal is similar to the alkali metal comprising the anode. The alkali metal salt of the electrolyte preferably comprises either lithium hexafluoroarsenate or lithium hexafluorophosphate dissolved in a 50/50 solvent mixture (by volume) of EC/DMC. In the present invention, the preferred electrolyte is 0.8M to 1.5M $LiAsF_6$ or $LiPF_6$ dissolved in a 50:50 mixture, by volume, of dimethyl carbonate and ethylene carbonate.

A preferred form of the electrochemical cell is a lithium ion cell wherein the anode/cathode couple is inserted into a conductive metal casing. A preferred material for the casing is stainless steel, although titanium, mild steel, nickel, nickel-plated mild steel and aluminum are also suitable. The casing may comprise a metallic lid having a sufficient number of openings to accommodate a glass-to-metal seal/terminal pin feedthrough for the cathode and anode. An additional opening may be provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the present invention can also be constructed in a case-positive design.

The glass-to-metal seal preferably comprises a corrosion resistant glass having from between about 0% to about 50% by weight silica such as CABAL 12, TA 23 or FUSITE MSG-12, FUSITE A-485, FUSITE 425 or FUSITE 435. The positive terminal pin feedthrough preferably comprises titanium although molybdenum and aluminum can also be used. The cell header comprises elements having compatibility with the other components of the electrochemical cell and is resistant to corrosion. The cell is thereafter filled with the electrolyte described hereinabove and hermetically sealed such as by close-welding a stainless steel ball over the fill hole, but not limited thereto. When the ionically conductive electrolyte becomes operatively associated with the anode and the cathode of the cell, an electrical potential difference is developed between terminals operatively connected to the anode and the cathode. During discharge, lithium ions migrate from the anode, i.e., the negative electrode to the cathode, i.e., the positive electrode. During recharge, lithium ions migrate in the opposite direction from the cathode to the anode. Migration of the lithium ions between the anode and cathode preferably occurs in atomic or molecular forms.

Figure 2:
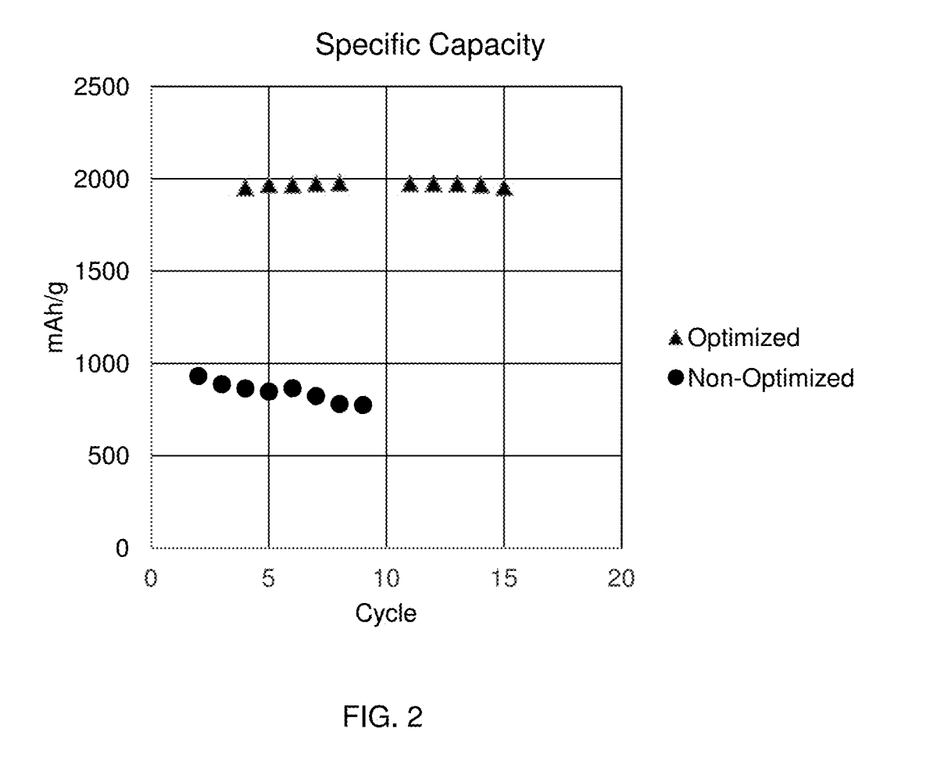
FIG. 2 is a graph that illustrates pulse discharge electrical performance test results of lithium ion electrochemical cells constructed with respective anodes composed of the active electrode materials and fabrication process of the present invention.

Sample 2032 lithium-ion button cells were constructed with anodes fabricated using the material formulation and fabrication method thereof of the present invention to test the electrical performance. Three 2032 lithium ion test cells were constructed with an anode composed of an active electrode material comprising particulates of silicon encapsulated in graphene having a particle size distribution ranging from about 1 μm to about 10 μm. Each of the anodes comprising the test cells were constructed having a thickness of about 10 μm and a porosity of about 50 percent. A counter electrode of pure lithium was used to complete each of the test cells.

In addition, three 2032 lithium ion control cells were constructed with anodes composed of the same active electrode material as the anodes of the test cells comprising particles of silicon encapsulated in graphene. The cathodes of each of the three control cells were composed of pure lithium. However, each of the anodes the comprised the control cells were constructed with an internal porosity of 40 percent and a thickness of 15 μm, a thickness that was 1.5 times thicker than the thickness of the anodes used in the respective test cells.

All three test and control cells were subjected to a pulse discharge regimen to test the specific capacity of the respective cells. Each of the cells were tested at a 10 C discharge rate to a predetermined threshold voltage of about 1.5 V. The pulse discharge regimen included a series of alternating 5 second current pulse and 5 second rest periods until a nominal voltage of 1.5V was reached. As illustrated in the graph, both cells exhibited a fairly uniform specific capacity. However, the test cells comprising the anode having the reduced thickness and increased porosity exhibited a significantly increased specific capacity as compared to the control cells. As shown in the graph of FIG. 2, the test cells comprising the anode with the optimized anode design exhibited a specific capacity of about 1,970 mAh/g whereas the control cell comprising the thicker anode and decreased internal porosity, exhibited a specific capacity of about 825 mAh/g at a pulse discharge rate of 10 C. An anode of the present disclosure had an increased specific capacity by almost 58 percent, in comparison to the control anode at an increased discharge rate of 10 C. As further indicated by the test results, the lithium ion cells that comprised the electrodes of the present invention retained more than 90 percent of its capacity when charged/discharged at pulsed current rates of 10 C. The test results indicate that constructing the anode having a smaller thickness and an increased internal porosity of about 50 percent significantly increases cell capacity at increased discharge rates. This would seem to indicate that the test cell comprising the thinner electrode and porosity of about 50 percent has a greater utilization of charge capacity particularly at higher rate discharge testing.

Thus, the results of the pulse discharge regimen at a discharge rate of 10 C clearly show the significance of the electrode material particle structure and the optimized electrode structure comprising the reduced electrode thickness and increased internal porosity. It is appreciated that various modifications to the inventive concepts described herein may be apparent to those of ordinary skill in the art without departing from the spirit and scope of the present invention as defined by the appended claims.

What is claimed is:

1. An electrode, comprising an electrochemically active material comprising particles disposed in a matrix, wherein the particles each comprise:
   a first component comprising graphene, graphene oxide, or a combination thereof; and
   a second component encapsulated by the first component, wherein the electrode is calendered, such that the first component forms an electrically conductive matrix and the electrode comprises channels and has an internal porosity that ranges from about 40 to about 60 percent, wherein the channels are configured to increase a diffusion rate and volume of lithium ions within the electrode.

2. The electrode of claim 1, wherein the second component is selected from the group consisting of silicon, silicon oxide, tin, tin oxide, antimony, aluminum, silver, germanium, gallium, magnesium, zinc, lead, bismuth, carbon, titanium oxide, lithium titanium oxide, alloys thereof, intermetallics thereof, and mixtures thereof.

3. The electrode of claim 1, wherein the particles of the electrochemically active material have a particle size distribution that ranges from about 0.5 µm to about 10 µm.

4. The electrode of claim 1, wherein the second component has a particle size distribution that ranges from about 30 nm to about 50 nm.

5. The electrode of claim 1, wherein the electrode has a thickness that ranges from about 5 µm to about 50 µm.

6. The electrode of claim 1, wherein the internal porosity is measured by the equation:

$$\text{Internal Porosity }(\%) = 1 - \left(\frac{\text{measured density}}{\text{theoretical density}}\right);$$

wherein the measured density is measured by dividing the mass of the dried electrode by its volume and the theoretical density is the density of the electrode that is 100 percent dense.

7. A method of fabricating an electrode of claim 1, the method comprising:
   mixing the electrochemically active material with a binder to create a mixture;
   adding a solvent to the mixture to create an electrode slurry;
   coating the electrode slurry on a substrate;
   drying the electrode slurry to substantially remove the solvent; and
   calendering the dried electrode slurry to form an electrode having an internal porosity measured by the equation:

$$\text{Internal Porosity }(\%) = 1 - \left(\frac{\text{measured density}}{\text{theoretical density}}\right);$$

wherein the measured density is measured by dividing the mass of the dried electrode by its volume and the theoretical density is the density of the electrode that is 100 percent dense.

8. The method of claim 7, wherein the electrochemically active material comprises a second component selected from the group consisting of silicon, silicon oxide, tin, tin oxide, antimony, aluminum, silver, germanium, gallium, magnesium, zinc, lead, bismuth, carbon, titanium oxide, lithium titanium oxide, alloys thereof, intermetallics thereof, and mixtures thereof.

9. The method of claim 8, wherein the electrode comprises particles comprising the second component encapsulated by the first component.

10. The method of claim 9, wherein the particles have a particle size distribution that ranges from about 1 µm to about 10 µm.

11. The method of claim 8, wherein the second component has a particle size distribution that ranges from about 30 nm to about 50 nm.

12. The method of claim 7, wherein the binder is selected from the group consisting of a fluoro-resin powder, polytetrafluoroethylene (PTFE), polyvinylidene fluoride (PVDF), poly(acrylic) acid, polyethylenetetrafluoroethylene (ETFE), polyamides, polyimides, ultra-high molecular weight polyethylene (UHMWPE), styrene-butadiene rubber, cellulose, polyacrylate rubber, and copolymers of acrylic acid or acrylate esters with polyhydrocarbons including copolymers of acrylic acid and polyethylene and copolymers of acrylate esters and polypropylene, and mixtures thereof.

13. The method of claim 7, wherein the solvent is selected from the group consisting of water, ethanol, isopropyl alcohol, ethylene glycol, ethyl acetate, polar protiac solvents, polar aprotic solvents, N-methyl-2-pyrrolidone, and combinations thereof.

14. The method of claim 7, wherein the adding a solvent to the mixture further comprises adding a dispersant selected from the group consisting of glycol ethers, poly(ethylene oxide), block copolymers, acetylenic diols, 2,5,8,11-tetramethyl-6-dodecyn-5,8-diol ethoxylate, salts of carboxylic acids, alkali metal salt, ammonium salt, polysiloxanes, sodium dodecanoate, alkanolamide, lanolin, polyvinylpyrrolidone, sodium alkyl sulfate, sodium alkyl sulfonate, lecithin, polyacrylate, sodium silicate, including dispersants comprising polyethoxy groups or having the chemical formula $(C_2H_4O)_nC_{14}H_{22}O$, and combinations thereof.

15. An electrochemical cell, comprising:
   a negative electrode comprising an active electrode material comprising particles disposed in a matrix, wherein the particles each comprise;
      a first component comprising graphene, graphene oxide, or a combination thereof; and
      a second component encapsulated in the first component,
      wherein the negative electrode is calendered, such that the first component forms an electrically conductive matrix and the negative electrode comprises channels and has an internal porosity that ranges from about 40 to about 60 percent;

a positive electrode comprising a lithium component; and
an ionically conductive electrolyte solution in which the negative and positive electrodes are immersed;
wherein the channels are configured to increase a diffusion rate and volume of lithium ions within the negative electrode.

16. The electrochemical cell of claim 15, wherein the second component is selected from the group consisting of silicon, silicon oxide, tin, tin oxide, antimony, aluminum, silver, germanium, gallium, magnesium, zinc, lead, bismuth, carbon, titanium oxide, lithium titanium oxide, alloys thereof, intermetallics thereof, and mixtures thereof.

17. The electrochemical cell of claim 15, wherein the active electrode material has a particle size distribution that ranges from about 0.5 µm to about 10 µm.

18. The electrochemical cell of claim 17, wherein the second component has a particle size distribution that ranges from about 30 nm to about 100 nm.

19. The electrochemical cell of claim 15, wherein the negative electrode comprises from about 28 weight percent to about 70 weight percent of the first component, based on the total weight of the negative electrode.

20. The electrochemical cell of claim 19, wherein the negative electrode comprises from about 30 weight percent to about 70 weight percent of the second component, based on the total weight of the negative electrode.

21. The electrochemical cell of claim 20, wherein the negative electrode comprises from about 0.01 weight percent to about 5 weight percent of a non-active carbon material, based on the total weight of the negative electrode.

22. The electrode of claim 1 further comprising a binder, wherein the binder is selected from the group consisting of a fluoro-resin powder, polytetrafluoroethylene (PTFE), polyvinylidene fluoride (PVDF), poly(acrylic) acid, polyethylenetetrafluoroethylene (ETFE), polyamides, polyimides, polyethylene, styrene-butadiene rubber, cellulose, polyacrylate rubber, and copolymers of acrylic acid or acrylate esters with polyhydrocarbons including copolymers of acrylic acid and polyethylene and copolymers of acrylate esters and polypropylene, and mixtures thereof.

* * * * *